US009701405B2

(12) United States Patent  
Stucki

(10) Patent No.: US 9,701,405 B2  
(45) Date of Patent: Jul. 11, 2017

(54) TAIL ROTOR DEVICE OF A HELICOPTER

(71) Applicant: Marenco Swisshelicopter AG, Pfäffikon (CH)

(72) Inventor: Martin Stucki, Pfäffikon (CH)

(73) Assignee: Marenco Swisshelicopter AG, Pfäffikon (CH)

( * ) Notice: Subject to any disclaimer, the term of this patent is extended or adjusted under 35 U.S.C. 154(b) by 119 days.

(21) Appl. No.: 15/041,430

(22) Filed: Feb. 11, 2016

(65) Prior Publication Data

US 2016/0264240 A1   Sep. 15, 2016

(30) Foreign Application Priority Data

Mar. 9, 2015 (CH) ..................................... 00318/15

(51) Int. Cl.
| | |
|---|---|
| *B64C 27/00* | (2006.01) |
| *B64C 27/82* | (2006.01) |
| *B64C 27/08* | (2006.01) |
| *B64C 27/473* | (2006.01) |

(52) U.S. Cl.
CPC .............. *B64C 27/82* (2013.01); *B64C 27/08* (2013.01); *B64C 27/473* (2013.01); *B64C 2027/8254* (2013.01)

(58) Field of Classification Search
CPC .... B64C 2027/8209; B64C 2027/8254; B64C 27/82; B64C 11/001
See application file for complete search history.

(56) References Cited

U.S. PATENT DOCUMENTS

| | | | | |
|---|---|---|---|---|
| 3,594,097 | A | | 7/1971 | Mouille et al. |
| 4,506,849 | A | * | 3/1985 | Lemont .................. B64C 27/20 |
| | | | | 244/17.11 |
| 5,251,847 | A | * | 10/1993 | Guimbal ................ B64C 27/82 |
| | | | | 244/17.19 |

(Continued)

FOREIGN PATENT DOCUMENTS

| | | |
|---|---|---|
| EP | 0508025 | 10/1992 |
| EP | 0508025 A1 | 10/1992 |

OTHER PUBLICATIONS

European Search Report dated Jul. 19, 2016 for Application EP No. 16151912.

*Primary Examiner* — Richard G Davis  
(74) *Attorney, Agent, or Firm* — Paul D. Bianco; Gary S. Winer; Fleit Gibbons Gutman Bongini & Bianco PL

(57) ABSTRACT

A tail rotor device, which can be attached to a tail boom of a rotary wing aircraft, in particular of a helicopter, encompassing a sheathing, which forms an air flow channel with a channel depth running in the direction of a channel axis perpendicular to the vertical axis and longitudinal axis and an inner channel diameter, so that a tail rotor with rotor blades can be rotatably mounted in the air flow channel, wherein the sheathing is designed in such a way that its channel depth in a negative longitudinal direction tapers toward the back, wherein the objective is to improve the forward flight characteristics during operation and reduce the power consumption of the main rotor. This is achieved by virtue of the selected variable channel depth is always less than one fourth of the inner channel diameter, and the ratio between the variable channel depth of the sheathing in the direction of the longitudinal axis and the inner channel diameter of the sheathing lies between 20.5% and 14%.

7 Claims, 3 Drawing Sheets

(56) References Cited

U.S. PATENT DOCUMENTS

2009/0121075 A1 5/2009 Marze
2015/0158584 A1* 6/2015 Mores ............... B64C 27/82
 244/17.21

* cited by examiner

TAIL ROTOR DEVICE OF A HELICOPTER

TECHNICAL FIELD

The present invention describes a tail rotor device, which can be attached to a tail boom of a rotary wing aircraft, in particular of a helicopter, encompassing a sheathing, which forms an air flow channel with a channel depth running in the direction of a channel axis perpendicular to the longitudinal axis and an inner channel diameter, so that a tail rotor with a plurality of rotor blades can be rotatably mounted in the air flow channel, wherein the sheathing is designed in such a way that its channel depth in the longitudinal progression of the sheathing tapers in the direction away from the tail boom.

PRIOR ART

Commercially available are helicopters which, in addition to a main rotor, exhibit a tail rotor device that is arranged on a tail boom, wherein the tail rotor device can be exposed or enveloped by a sheathing, and is used to generate a lateral thrust, so as to counteract the torque generated by the main rotor.

Discussed below is the sheathed variant of the tail rotor device, various embodiments of which have already been known for quite some time. The sheathing of the tail rotor device is currently popular in small and medium helicopter weight classes, since not only can the noise and vibrations be reduced and an improved flow into a tail rotor as part of the tail rotor device be ensured, but because in particular persons, as well as the tail rotor itself, are better protected by the sheathing.

In addition, tail rotor devices with a sheathing usually exhibit a better thrust-power ratio. This can be attributed to the reduction in tail rotor power, since blade tip losses can be minimized, and the jet contraction is prevented by the diffusor action downstream from the tail rotor. On the other hand, the improved ratio results from an added thrust, which is generated by the accelerated flow at the channel inlet. Correspondingly more thrust is achieved by a tail rotor with sheathing than when using a free tail rotor at the same power consumption.

Known from EP0508025 is a tail rotor device, which is optimized for hovering operations and swerving maneuvers at different flying speeds. A tail rotor device with sheathing that envelops a tail rotor is arranged on a tail boom. The sheathing forms an air flow channel, in which the tail rotor is mounted. A channel depth T of the sheathing in the direction of the rotational axis of the tail rotor is designed in such a way that the walls of the sheathing fully envelop the tail rotor in the direction of the rotational axis of the tail rotor. The channel depth T exhibits a constant value, and is larger in design than the depth of the tail rotor, so that the rotor blades lie completely inside the air flow channel. In EP0508025, a channel depth of between 50 cm and 60 cm is selected. A drive train is guided through the tail boom up to the tail rotor, so that the tail rotor is drivable. As may be gleaned from FIG. 1 of EP0508025, the selected tail rotor diameter D is distinctly larger at between 120 cm and 135 cm than the channel depth T. As known from prior art, a ratio (D/T) of tail rotor diameter D to channel depth T of greater than 30% is usually selected, so that a good thrust-power ratio can be achieved.

This ratio is based on not selecting a very large tail rotor diameter D from scratch, so as to keep the lever arm of the mass situated in the rear area as small as possible, making it possible to confine the helicopter center of gravity within the permissible range. In order to be able to achieve the necessary thrust and good efficiency at the small tail rotor diameters D, the channel depth T is most often increased even further, and additional stators are in part even incorporated, gaining more thrust from the angular momentum of the flow.

However, in light of the further enlarged channel depth T and associated larger surface of the channel walls or entire sheathing surface, these improvement measures end up generating an enlarged form resistance of the helicopter during forward flight. The configuration of stators also increases the resultant noise level of a sheathed tail rotor, so that while using stators is expedient for increasing efficiency, it sacrifices flight comfort.

In order to increase thrust efficiency while simultaneously further lowering the noise level, U.S. Pat. No. 4,506,849 introduced a sheathing in the form of a closed ring with a narrow design in the longitudinal direction of the helicopter. In the direction of the channel axis, which is aligned perpendicular to the longitudinal and vertical axis of the helicopter, this ring is situated downstream from the rotor blades or their rotor blade plane, so that the ring does not represent a sheathing, since the rotor blade plane is not located in the ring, but upstream from the latter. Reference can actually not be made to any channel formation. This rather exotic solution contradicts the previous approach of using sheathings with the largest possible channel depths, and arranging the tail rotor in an inner channel diameter, surrounded by channel walls. The ratio (D/T) between the tail rotor diameter D and the channel depth T when using such a narrow ring measures about 12.5% according to U.S. Pat. No. 4,506,849. Using such a ring as the sheathing made it possible to prevent jet contraction, thereby yielding an elevated efficiency. However, because advantages could not be achieved for all conceivable flight conditions, this type of sheathing has enjoyed hardly any commercial success.

In the mid-70's, another configuration for an extremely compact tail rotor device of a helicopter was disclosed by D. R. Clark in "Aerodynamic Design Rationale for the Fan-in-Fin on the S-67 Helicopter", American Helicopter Society 31$^{st}$ Annual National Forum, Washington, D.C., May 13-15, 1975. Shown therein is a tail rotor with an extremely small tail rotor diameter, which is enveloped by a sheathing that has a radially unsymmetrical design, wherein the width of the sheathing tapers in a negative longitudinal axis direction L toward the back, from the tail boom side to the end of the sheathing in the direction of the longitudinal axis L. The maximum channel depth measured on the order of half the tail rotor diameter in the tests.

In order to achieve a suitable air resistance, the inlet and outlet radius along with the outer geometry of the sheathing were optimized. The tapering sheathing located downstream, which is concavely curved as viewed from outside, made it possible to economize on weight, which was recognized as advantageous. However, because the more nozzle-like tail rotor device failed to convince in all flight maneuvers, the direction of development embarked upon was not further pursued. The possible potential offered by the shape of the sheathing was evidently not recognized, and the search continued for other configurations for sheathings or tail rotor devices in ensuing years. These configurations first and foremost exhibited sheathings with the largest possible channel depths and symmetrically shaped jacket housings. As a consequence, these shapes went in another direction, but the results were also unable to achieve the desired advantages.

SUMMARY OF THE INVENTION

The object of the present invention is to provide a tail rotor device of a helicopter, which while in operation improves the forward flight characteristics and reduces the power consumption of the main rotor.

When using the tail rotor device, the sheathing makes it possible to reduce the overall power consumption of the helicopter, while retaining the known positive characteristics of the sheathing, such as protecting the rotor blades against collisions with foreign bodies, improving the thrust-power ratio and above all suppressing noise.

This object is achieved by a tail rotor with a comparatively extremely large tail rotor diameter, which is at least five times larger than the channel depth, and hence utilizes a correspondingly large inner channel diameter. The tapering of the sheathing or channel depth in a negative longitudinal axis direction, proceeding from the helicopter nose in the direction of the rear in the progression of the sheathing in a direction facing away from the main rotor, is here selected in a defined ratio between the channel depth and inner channel diameter or tail rotor diameter.

In order to optimally raise the vane and yaw stability, the shape of the sheathing is combined with a tail rotor, whose tail rotor diameter measures at least 1000 millimeters.

BRIEF DESCRIPTION OF THE DRAWINGS

A preferred exemplary embodiment of the subject matter of the invention will be described below in conjunction with the attached drawings.

FIG. 2 shows a side view of a helicopter with a tail rotor device according to the invention, while

FIG. 4a shows a detailed side view of the tail rotor with sheathing from the inlet side, while FIG. 4b shows a sectional view of the tail rotor device, cut along the Y-Y line on FIG. 4a.

DESCRIPTION

Figure 1:
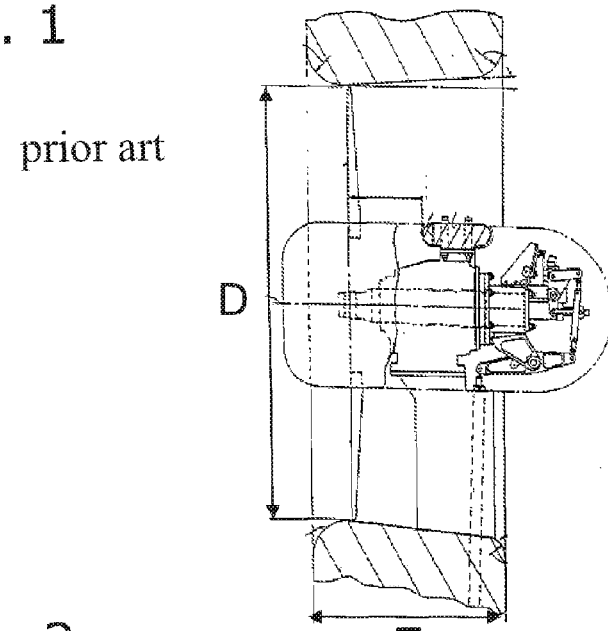
FIG. 1 shows a partial sectional view of a tail rotor device according to prior art.
Figure 2:
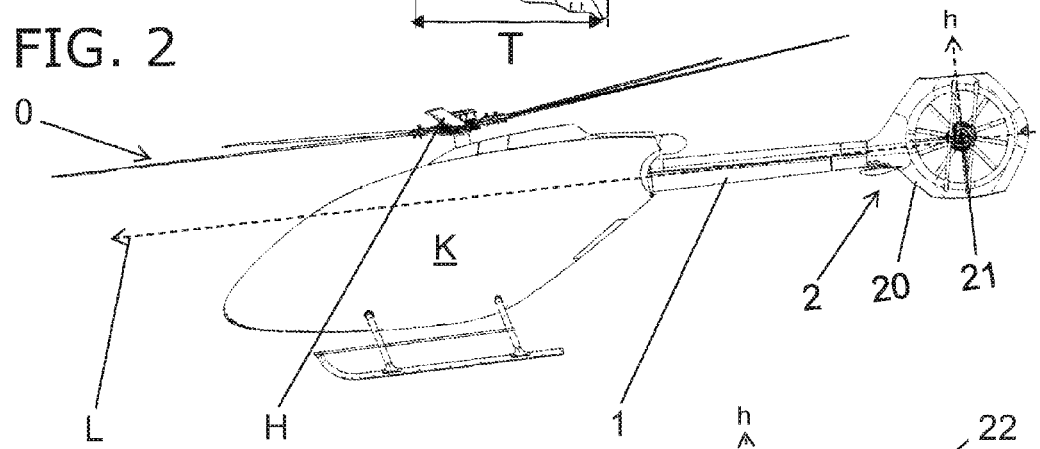

Shown here as an example is a helicopter 0, which exhibits a cabin K, from which a tail boom 1 extends in the direction of the tail of the helicopter 0. The main rotor H is driven by a drive not illustrated and described in any more detail, wherein this drive also drives a tail rotor device 2 that adjoins the tail boom 1 in the direction of the longitudinal axis L. The longitudinal axis L forms the longitudinal axis L of the helicopter 0 and tail rotor device 2. The tail rotor device 2 encompasses a tail rotor 21, which is spaced apart from a sheathing 20 by a slight radial distance. Since the type of drive of the main rotor H and tail rotor 21 does not play a significant role in this application and is interchangeable, this will not be discussed in any more detail.

The tail rotor 21 is situated outside of the rotor circuit of the main rotor H, and during operation generates a thrust acting perpendicular to the longitudinal axis L and vertical axis h in the channel axis direction A, which can also be referred to as horizontal thrust, thereby offsetting the torque emanating from the main rotor H. The sheathing 20 that envelops the tail rotor 21 yields a tail rotor device 2 in the form of a ducted fan, wherein the sheathing 20 is an essentially cylindrically shaped jacket housing 20.

Figure 3:
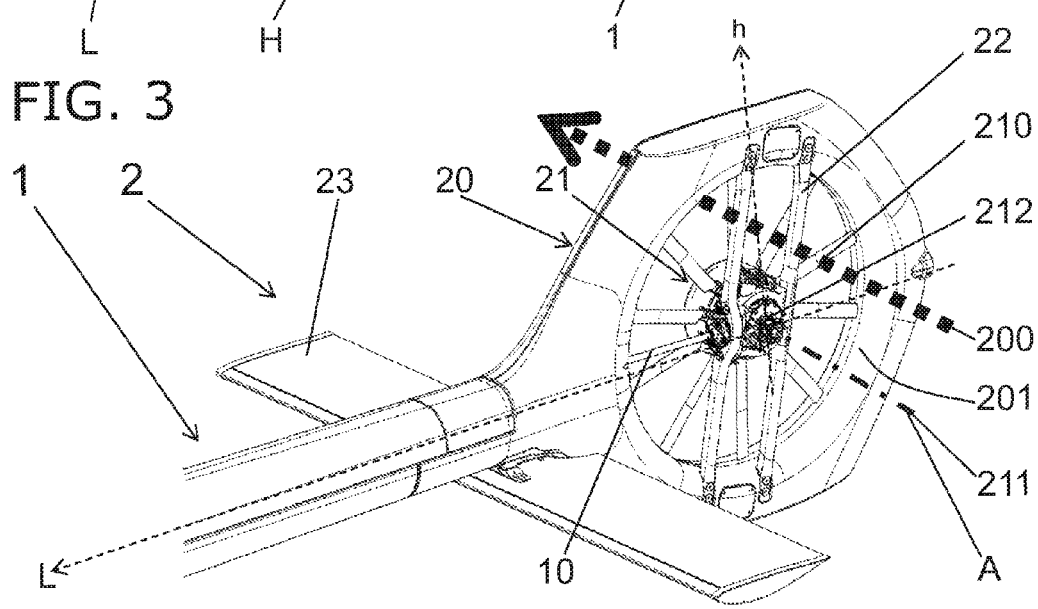
FIG. 3 shows a perspective view of a tail boom with tail rotor device fastened thereto.

As may be gleaned from the perspective, detailed view of the tail rotor device 2 on FIG. 3, an elevator 23 is situated upstream from the sheathing 20 in a longitudinal direction, facing the tail boom 1. For reasons of clarity, it was decided not to show a vertical stabilizer on the figures.

The sheathing 20 exhibits an inner jacket wall 201, which envelops an air flow channel 200 with a channel axis A. The air flow channel 200 is perpendicular to the vertical axis h and runs toward the longitudinal axis L. The direction of the air passing through the air flow channel 200 during operation is denoted by the dashed arrow. The tail rotor 21 is mounted inside of the air flow channel 200, and hence enveloped by the sheathing 20 in the direction of the channel axis A.

The tail rotor 21 exhibits a plurality of rotor blades 210, and is fixedly held by two support struts 22 in the air flow channel 200, spaced apart from the inner jacket walls 201. The rotor blades 210 are slightly twisted, and can be varyingly positioned during operation by means of a pitching device. The tail rotor 21 exhibits a rotational axis 211 situated parallel to the channel axis A, here even identically to the channel axis A. The tail rotor 21 exhibits a pivot bearing 212, to which a carriage wheel is fastened. The rotor blades 210 are mounted to this carriage wheel so as to rotate along with the carriage wheel. A tail rotor gearing and controller for pitch adjustment will here not be discussed in any greater detail, since the expert is aware of solutions in these areas. The tail rotor gearing and pitch adjustment controller are used to controllably rotate and adjust the rotor blades 210. The pivot bearing 212, and hence the rotor blades 210, are driven around the rotational axis 211 by means of a drive train 10, which is passed through the tail boom 1 from the drive to the tail rotor device 2 in a negative longitudinal direction L.

The sheathing 20 or inner jacket wall 201 are roughly toroidal or annularly toroidal in design, wherein the sheathing 20 exhibits a length U in the direction of longitudinal axis L, and is attached or molded to the tail boom 1. The inner jacket wall 201 is partially curved in design.

Figure 4A:
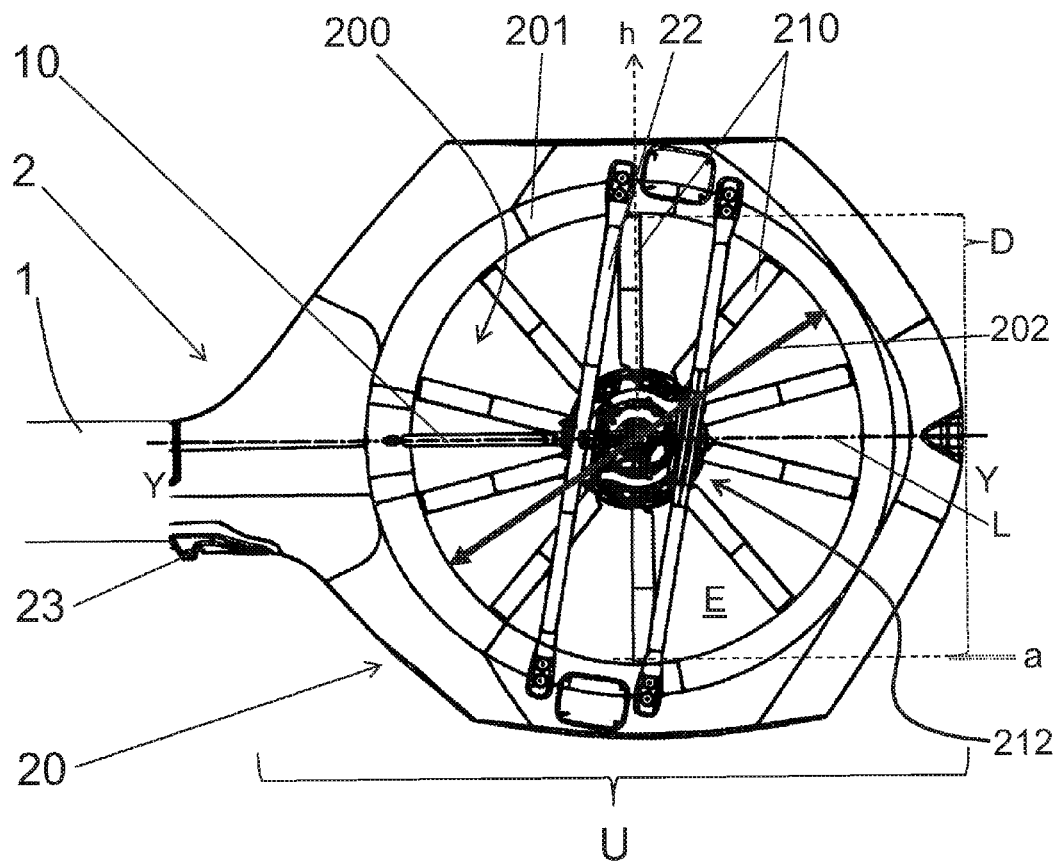

Essentially discernible in the side view is a ring with an opening, in which the tail rotor 21 is arranged. This opening represents the air flow channel 200, which allows air to pass in a direction perpendicular to the vertical axis h and longitudinal axis L, and hence in the direction of the channel axis A. The side view according to FIG. 4a shows a view of the inlet side of the sheathing 20. During operation of the tail rotor 21, air is aspirated into this inlet side and through the air flow channel 200. The curvature of the inner jacket wall 201 on the inlet side is shown in a side view. During operation, air is aspirated through the tail rotor 21 around this curved inner jacket wall 201, and transported through the air flow channel 200.

The inner channel diameter 202 is larger in design by distance a than the tail rotor diameter D. The distance a or also blade gap a should measure less than 0.5% of the tail rotor diameter D, so as to minimize the pressure loss in the air flow channel 200 or minimize air swirls.

Ten rotor blades 210 are here arranged on the tail rotor 21 or carriage wheel. The two support struts 22 hold the tail rotor 21, so that the rotor blades 210 are held in a fixed rotor blade plane E. The surface of the individual rotor blades 210 correspondingly covers a portion of the overall channel surface of the air flow channel 200 in the rotor blade plane E. Tests have demonstrated that a surface density as a ratio between the surface covered by the rotor blades 210 and the overall channel surface of the air flow channel 200 should measure between 25% and 35%, so as to generate a sufficient tail rotor thrust.

Figure 4B:
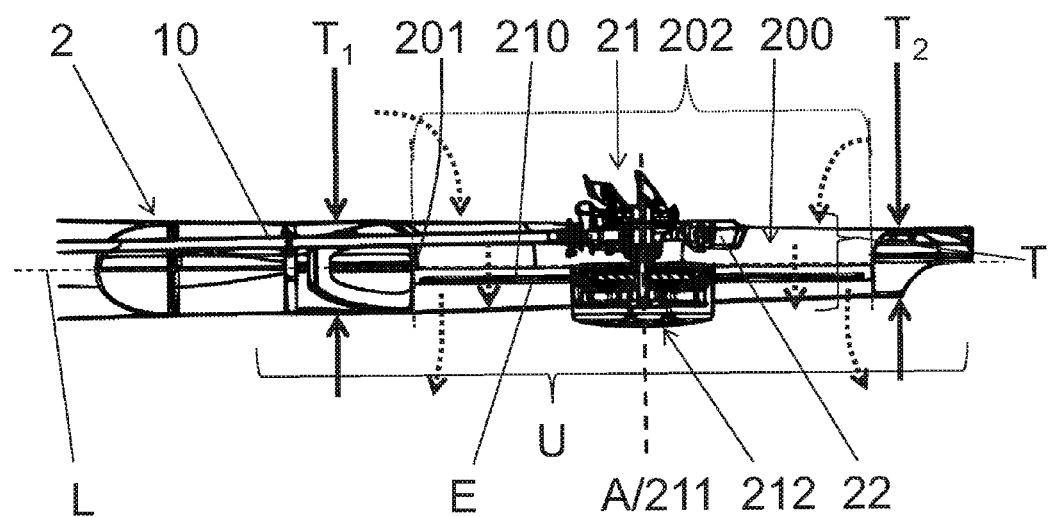

In the sectional view according to FIG. 4b, the channel depth is marked T, wherein the air flow on FIG. 4b runs from top to bottom from the inlet side to an outlet side. The air flow through the air flow channel 200 with the tail rotor device 2 in operation is denoted by various dashed arrows.

The channel depth T runs in a direction toward the channel axis A or rotational axis 211, and hence perpendicular to the vertical axis h and longitudinal axis L. The channel depth T is determined by the length of the inner jacket wall 201 in the direction of the channel axis A, and here varies in the progression of the length U of the sheathing in the direction of the longitudinal axis L, more precisely in a negative longitudinal axis direction L directed away from the cabin K. The channel depth T tapers from a larger first channel depth T1 up to a second smaller channel depth T2 in the direction of the side of the sheathing 20 facing away from the tail boom 1.

As demonstrated by varying several parameters, a positive effect on the flight characteristics can surprisingly be achieved by selecting a sheathing with a largest possible inner channel diameter 202 and correspondingly large tail rotor diameter D, and by here designing the taper to have a specific ratio between the channel depths T1, T2 and inner channel diameter 202.

The inner channel diameter 202 or tail rotor diameter D of the tail rotor 21 tailored thereto are selected in such a way that a ratio between the variable channel depth T of the sheathing 20 in the negative longitudinal axis direction L and the inner channel diameter 202 of the sheathing 20 lies between 20.5% and 14%. Accordingly, the inner channel diameter 202 selected must be at least five times larger than the larger channel depth T1.

Even though the efficiency of the lateral thrust generation is not as high given a tapering jacket housing 20 than for sheathings 20 with a constant, largest possible channel depth T, tests have shown such a tapering to be advantageous. For stability reasons, however, the smaller channel depth T2 should not be further reduced, so that the ratio is equal to or greater than 14%.

The optimal results for generating a sufficient thrust in the lateral direction [were achieved by] equipping a tail rotor device 2 with a sheathing 20 having an inner channel diameter 202 of 1208 mm, wherein the selected tail rotor diameter D was equal to 1200 mm. As demonstrated in tests, the selected tail rotor diameter D, and hence the inner channel diameter 202, should be at least 1000 mm, so that a sufficiently large tail rotor surface can contribute to a good vane and yaw stability.

The channel depth T varied between the first channel depth T1 of 245 mm and the second channel depth T2 of 175 mm, so that the channel depth T tapers in a negative longitudinal axis direction L proceeding from the side of the tail boom 1 toward the back, and hence away from the tail boom 1, thus yielding a ratio between the channel depth T and inner channel diameter 202 of 14.48% to 20.28%. T2 was always selected to be larger than T1/2. The selected ratio between the variable channel depth T of the sheathing 20 in the direction of the longitudinal axis L and the inner channel diameter 202 of the sheathing 20 was between 25% and 10%, and led to good results.

The advantages to the described configuration of the tail rotor device 2 are that a good vane and yaw stability can be generated by a large tail rotor diameter on the one hand, and that the main rotor H has to draw less power during forward flight on the other, since the form resistance of the tail rotor device 2 is less by comparison to known, deeper air flow channels or more compact tail rotor devices.

Selecting a ratio between the tail rotor diameter D and diameter of the main rotor H of between 10 and 12% makes it possible to achieve an optimized thrust generation by the tail rotor 21. It was especially preferred to select a ratio between D and the diameter of the main rotor H of 10.84%.

Figure 5:
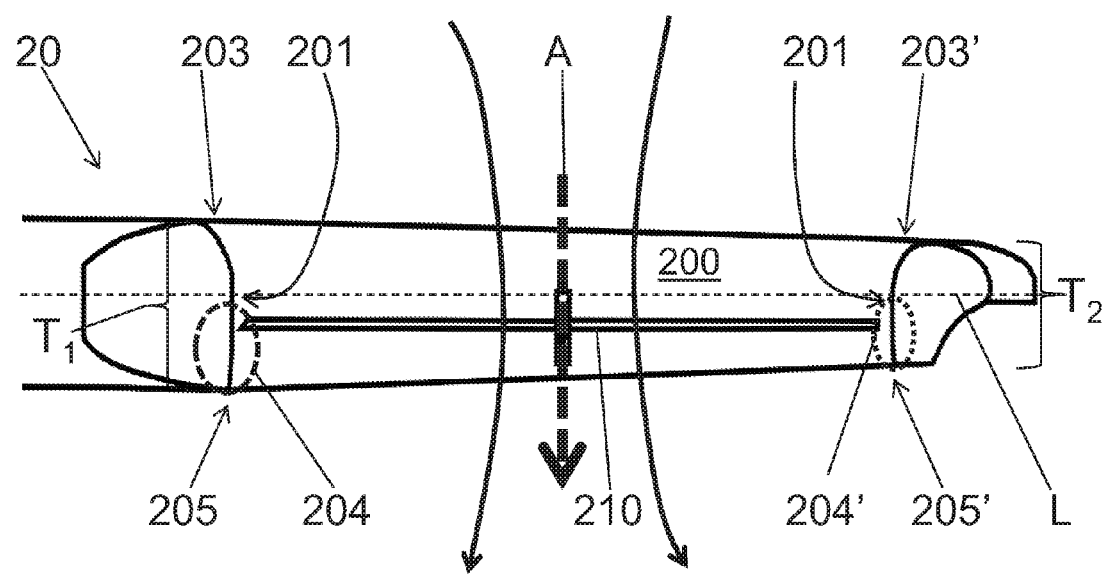
FIG. 5 shows a schematic sectional view of the tail rotor device.

FIG. 5 again shows a schematic sectional view through the sheathing 20 and interior tail rotor 21. The inner jacket wall 201 completely envelops the air flow channel 200, wherein the progression of the inner jacket wall 201 exhibits varying sections and curvatures. In the area of an inlet 203, 203' at the top of FIG. 5, the inner jacket wall 201 is curved to less of an extent than on the opposing outlet 205. The curvature at the inlet 203 at the height of the larger channel depth T1 also is differently configured than the curvature at the inlet 203' at the height of the smaller channel depth T2.

In the area in front of the outlet 205 in the direction of the channel axis A downstream from the rotor, a diffuser section 204, 204' adjoins the cylindrical channel form of the inner jacket wall 201. It is slightly angled toward the channel axis A, and gives the exiting air flow a desired direction. Shortly before exiting, the air flow then passes by the nearly straight, rather sharp-edged outlet 205, 205'. While the lengths of the diffuser sections 204, 204' differ in design on the side of the larger channel depth T1 and smaller channel depth T2, both outlets 205, 205' exhibit the same sharp edges.

REFERENCE LIST

0 Helicopter
K Cabin
H Main rotor
L Longitudinal axis
h Vertical axis
1 Tail boom
10 Drive train
2 Tail rotor device
20 Sheathing/jacket housing
200 Air flow channel
201 Inner jacket wall
202 Inner channel diameter
(at height of longitudinal axis/perpendicular to rotational axis)
T Channel depth
$T_1$, $T_2$ Tapering of channel depth in longitudinal direction
U Length sheathing
A Channel axis
203 Inlet
204 Diffuser section
205 Outlet
21 Tail rotor (rotating mechanism/rotor blade suspension)
210 Rotor blade
E Rotor blade plane
D Tail rotor diameter (D<202)
211 Rotational axis (held coaxially in channel)
212 Pivot bearing
a Distance/blade gap
22 Support struts
23 Elevator

The invention claimed is:

1. A tail rotor device, which can be attached to a tail boom of a rotary wing aircraft, in particular of a helicopter, encompassing a sheathing, which forms an air flow channel with a channel depth running in the direction of a channel axis perpendicular to the longitudinal axis of the aircraft and an inner channel diameter, so that a tail rotor with a plurality of rotor blades can be rotatably mounted in the air flow channel, wherein the sheathing is designed in such a way that its channel depth in the longitudinal progression of the sheathing tapers in the direction away from the tail boom, wherein
- a selected variable channel depth is always smaller than one fourth of the inner channel diameter, and
- the ratio between the variable channel depth of the sheathing in the direction of the longitudinal axis and the inner channel diameter of the sheathing lies between 25% and 10%.

2. The tail rotor device according to claim 1, wherein the selected inner channel diameter of the sheathing is greater than 1000 millimeters.

3. The tail rotor device according to claim 1, wherein a selected first channel depth is less than 250 millimeters, and a second channel depth is greater than 135 millimeters.

4. The tail rotor device according to claim 1, wherein a selected second channel depth is greater than half the first channel depth.

5. The tail rotor device according to claim 1, wherein a surface density as a ratio between the surface covered by the rotor blades and the overall channel surface of the air flow channel lies between 25% and 35%.

6. The tail rotor device according to claim 1, wherein a blade gap between rotor blade tips and inner jacket wall measures less than 0.5% of the tail rotor diameter.

7. The tail rotor device according to claim 1, wherein a ratio between the tail rotor diameter and diameter of a main rotor of between 10% and 12% is selected.

\* \* \* \* \*